United States Patent [19]

Schneider

[11] Patent Number: 4,664,065
[45] Date of Patent: May 12, 1987

[54] SEALED AQUARIUM

[76] Inventor: Delbert K. Schneider, 817 Harbor Ave., Ellenton, Fla. 33532

[21] Appl. No.: 814,877

[22] Filed: Dec. 30, 1985

[51] Int. Cl.[4] ..................... A01K 61/00; A01K 63/00
[52] U.S. Cl. ............................................. 119/3; 119/5
[58] Field of Search ........................................ 119/3, 5

[56] References Cited

U.S. PATENT DOCUMENTS

| | | | |
|---|---|---|---|
| 1,297,254 | 3/1919 | Sato | 119/5 |
| 2,652,807 | 9/1953 | Washburn | 119/3 |
| 3,168,887 | 2/1965 | Bodell | 119/5 X |
| 3,538,888 | 11/1970 | Speshyock | 119/5 |
| 3,886,904 | 6/1975 | King | 119/3 |

FOREIGN PATENT DOCUMENTS 2602181 7/1976 Fed. Rep. of Germany .......... 119/3

*Primary Examiner*—Robert P. Swiatek
*Attorney, Agent, or Firm*—Charles J. Prescott; Raymond H. Quist

[57] ABSTRACT

A container, having a sealable closure, has included therein distilled water, one or more aquatic plants, one or more herbivorous fish, an aquatic algae eating animal, inert particulate material and measured amounts of certain elements. The elements are nitrogen, potassium, phosphorous, calcium and magnesium. An air space is left at the top of the container and a pinhole provided in the closure. This shelf perpetuating, sealed aquarium requires no air pump or heater, and fish food is not added; however, sufficient light to maintain the aquatic plants in healthy condition is necessary.

13 Claims, No Drawings

SEALED AQUARIUM

BACKGROUND OF THE INVENTION

1. Field of the Invention

This invention relates generally to a fresh water aquarium for plants and fish, and more particularly to a sealed aquarium.

2. Description of Related Art

Conventional fresh water aquariums, such as those found in the home or in public displays, will typically contain water, gravel and/or sand, one or more types of fish and rooted or floating plants. In addition, an aeration pump, filter and thermostatically controlled heater are often used. Food for the fish and, sometimes, nutrients for the plants are added at intervals. Natural and/or artificial light is needed on a somewhat regular basis for plant life. An exchange of part or all the aquarium water and cleaning of the aquarium to remove algae and organic residues are accepted necessities. With a fish bowl it is possible to keep one or more fish without using an aeration pump. A removal of excess carbon dioxide produced by the fish from the water and absorption of oxygen by the water to replace that consumed by the fish occurs at the surface of the water. For larger aquariums, this passive exchange of gases is not adequate, and fish will die within the passage of a day if the aeration pump is not operating.

Efforts have been made to produce an aquarium which will be essentially sealed. U.S. Pat. No. 4,156,401, W. M. Ogui, entitled: "Sealed Self-Cleaning Aquarium Apparatus", discloses an arrangement which includes filters, a circulating pump and provides for adding fish food.

U.S. Pat. No. 4,064,837, W. H. Montgomery, entitled: "Self-Contained Aquarium System", discloses an aquarium which includes a separate equipment compartment containing filters and air pump.

U.S. Pat. No. 3,973,519, J. C. McCarty et al, entitled: "Screening Device in a Closed-Loop Aquaculture System", discloses a system having separate chambers for animals and filters connected by tubing. Recirculation of the water is utilized.

U.S. Pat. No. 3,438,356, C. L. Claff, entitled: "Fluid Habitat or Bath System for Marine Biological Studies", discloses apparatus permitting metabolism measurements of small fish.

All of the foregoing patents relate to systems incorporating means for circulating water and passing it through filters.

The present invention eliminates the need for pumps, exchange or replacement of water, filters and the addition of nutrients. Instead, the aquarium is essentially sealed, having only a pinhole to permit the release of any excess gas generated. All the components to be contained in the aquarium are introduced when it is initially set up. It is then sealed and placed where it will receive ambient light in an amount sufficient to maintain the plants in healthy condition. In addition to the plants, the aquarium contains fish, gravel and nutrients.

It is therefore an object of this invention to provide a sealed aquarium for fish and plants which is self contained and self perpetuating, requiring only exposure to light such as daylight.

It is also an object of this invention to provide a sealed aquarium which will support more than one variety of fish.

It is also an object of this invention to provide a sealed aquarium which is self cleaning.

In accordance with these and other objects which will become apparent hereafter, the instant invention will now be described.

SUMMARY OF THE INVENTION

A container, preferably having a volume of one liter or more, has gravel such as epoxy coated silicone gravel added to a depth of approximately five centimeters. Distilled water is added, leaving an air space at the top. At least two fish are introduced; one an algae eater and the other another type of herbivorous fish. At least one plant is added to provide a source of food for the herbivorous fish. From 0.00082 to 0.0010 grams per liter of nitrogen, from 0.0024 to 0.0041 grams per liter of phosphorous, from 0.0044 to 0.0055 grams per liter of potassium and from 0.0020 to 0.0060 grams per liter of calcium are also added. As the volume of the container is increased, the number of plants and fish may also be increased. For example, with 7.6 liters (two gallons) of distilled water, three fish including one catfish may be included along with six to eight plants 8 to 15 centimeters long (3–6 inches).

DESCRIPTION OF THE INVENTION

The invention is a combination of components which can be placed within a container which is then sealed, leaving only a pinhole to permit escape of any gas which may be produced. Included are one or more aquatic plants and one or more varieties of herbivorous fish and/or snails.

The fish will preferably include at least an algae eater such as *Plecostomus plecostomus* (Linnaeus), and will preferably also include other varieties such as one or more herbivorous Barbs. Suitable Barbs are: Tiger, Rosy, Black Ruby, Albino, Long Fin Rosy and Tin Foil.

To assure that the nutrients included in the container will fall within the inventive limits, it is desirable to start with distilled water. This also avoids the introduction of microscopic algae and protozoans present in tap or other water. The container, which may be the conventional rectangular tank or another shape, such as a jug, should have at least some transparent surface so that light will be admitted and the contents of the container may be observed. A rectangular container permits easier placement of plants of the rooted type, but a jug type container (preferably with an opening large enough to admit one's hand) may be more easily sealed. It is essential to leave some air space at the top although the exact amount of air space has not been found to be critical. Because the container is essentially sealed, no circulation of the gas between that in the air space and that outside the container occurs. If pressure rises in the tank, for example due to an increase in temperature, gas will be released through the pin hole. By the same token, a cooling of the tank will cause some external air to be admitted. No mechanical or other means is used to induce this limited exchange of gas.

Conventional gravel or sand is included to cover the bottom to a depth of about 5 cm (2 inches). This inert particulate material provides a place not only for rooting of the rooted type aquatic plants, but also an evironment in which bacteria will live and perform the conversion of fish feces and any dead plant material to mineral form.

The aquatic plants used may be of varieties commonly found in stores dealing in tropical fish such as cork screw, banana plants, Elodea, hairgrass, hornwort, Anacharis and water sprite. Plants of 8 to 15 centimeters (3-6 inches) are suitable for containers of the type which can be readily carried when filled. Larger, fixed aquariums may use larger plants.

The final components are minerals which must be added in controlled amounts. The desired minerals are nitrogen, phosphorous, potassium and calcium. Of course these must be in a water soluble form.

Nitrogen is added in a form of nitrate nitrogen in a quantity ranging from 0.00082 to 0.0010 gm/l (grams/liter). Phosphorus is added in a form of phosphoric acid ($P_2O_5$) in a quantity ranging from 0.0024 to 0.0041 gm/l of phosphorous. Potassium is added in a form of soluble potash ($K_2O$) in a quantity ranging from 0.0044 to 0.0055 gm/l of potassium. Calcium is added in a form of calcium carbonate ($CaCO_3$) in a quantity ranging from 0.0020 to 0.0060 gm/l calcium. Magnesium is added in a quantity ranging from 0.00011 to 0.00031 gm/l.

EXAMPLE I

In one example, an aquarium was established in an 18.925 liter (5 gallon) container of a jug type with about 7.6 liters (2 gallons) of distilled water. Washed, epoxy coated, silicone gravel was added to a depth of about 5 centimeters. Five plants (Elodea, Anacharis and banana plants) 8 to 15 centimeters in length were used. One catfish and two tiger barbs were placed in this container. Nutrients were introduced as follows: 0.0078 gm $N_2$, 0.031 gm P, 0.042 gm K, 0.0038 gm Ca and 0.0020 gm Mg.

EXAMPLE II

In another case, an aquarium was established in an 18.925 liter container with about 18.8 liters of distilled water. Washed, epoxy coated, silicone gravel was added to a depth of about 5 centimeters. Nine plants (Elodea and Anacharis) 8 to 15 centimeters in length were used. One catfish and two rosy barbs were placed in this container. Nutrients were introduced as follows: 0.0156 gm $N_2$, 0.046 gm P, 0.084 gm K, 0.011 gm Ca and 0.0020 Mg.

EXAMPLE III

In still another case, an aquarium was established in an 18.925 liter container with about 18.8 liters of distilled water. Washed, epoxy coated, silicone gravel was added to a depth of about 5 centimeters. Ten plants (Elodea and Anacharis) 8 to 15 centimeters in length were used. One catfish and four rosy barbs were placed in this container. Nutrients were introduced as follows: 0.0156 gm $N_2$, 0.046 gm P, 0.084 gm K, 0.0038 gm Ca and 0.0020 gm Mg.

It should be recognized that the plants and fish will already contain a certain amount of the minerals which are being added. In the metabolic processes an exchange of minerals to and from the living components will occur, so that the mineral content of the water will reach a quasi-balance with the living components which will be different than the absolute quantity of minerals added. Moreover, a certain amount of non-distilled water may be introduced in the process of adding plants and fish from uncontrolled sources. For this reason partial quantitative analyses of the water in estabished aquariums made in accordance with the invention have been performed.

EXAMPLE IV

Analysis of the container of Example I revealed element measurements as follows: nitrogen—1.37 mg/l; phosphorous—1.19 mg/l; potassium—13 mg/l; calcium—37 ppm and magnesium—3 ppm.

EXAMPLE V

Analysis of the container of Example II revealed element measurements as follows: nitrogen—5.43 mg/l; phosphorous—1.58 mg/l; potassium—4.3 mg/l; calcium—16 ppm and magnesium—2 ppm.

EXAMPLE VI

Analysis of the container of Example III revealed element measurements as follows: nitrogen—1.75 mg/l; phosphorous—1.18 mg/l; potassium—6.1 mg/l; calcium—10 ppm and magnesium—1 ppm.

These quantitative analyses may be summarized in ranges of nitrogen in a range of 1.37 to 5.43 mg/l; phosphorus in a range of 1.18 to 1.58 mg/l; potassium in a range of 4.3 to 13 mg/l; calcium in a range of 10 to 37 ppm and magnesium in a range of 1 to 3 ppm.

Visual examination of the plants and animals in the containers appear to reveal a slightly more vigorous plant growth in the container of the first example; however, all fish appeared to be in good health.

While the instant invention has been described herein in what is conceived to be the most practical and preferred embodiment, it is recognized that departures may be made therefrom within the scope of the invention, which is therefore not to be limited to the details disclosed herein, but is to be accorded the full scope of the claims so as to embrace any and all equivalent apparatus and articles.

I claim:

1. A solution for supporting in a sealed container a fresh water herbivious fish and an aquatic plant comprising:
   distilled water;
   0.00080 to 0.0055 grams per liter of nitrogen;
   0.0040 to 0.013 grams per liter of potassium; and
   0.0011 to 0.0045 grams per liter of phosphorous.

2. A solution in accordance with claim 1 further including:
   calcium.

3. A solution in accordance with claim 2 wherein:
   said calcium is from 0.00020 to 0.040 grams per liter.

4. A solution in accordance with claim 1 further including:
   magnesium.

5. A solution in accordance with claim 4 wherein:
   said magnesium is from 0.00010 to 0.003 grams per liter.

6. A solution in accordance with claim 1 wherein:
   said nitrogen is from 0.0010 to 0.0055 grams per liter;
   said potassium is from 0.0040 to 0.0060 grams per liter; and
   said phosphorous is from 0.0015 to 0.0040 grams per liter.

7. A sealed aquarium providing a closed ecological system for a herbivorous fish and an aquatic plant not requiring the periodic supply of nutriments nor the supply of air by an air pump, consisting of a container having a closure, sealed except for a pinhole, containing components comprising:
   distilled water;
   0.00080 to 0.0055 grams per liter of nitrogen;

0.0040 to 0.013 grams per liter of potassium; and
0.0011 to 0.0045 grams per liter of phosphorous.

8. A sealed aquarium in accordance with claim 7 further including:
   calcium.

9. A sealed aquarium in accordance with claim 8 wherein:
   said calcium is from 0.00020 to 0.040 grams per liter.

10. A sealed aquarium in accordance with claim 7 further including:
    magnesium.

11. A sealed aquarium in accordance with claim 20 wherein:
    said magnesium is from 0.00010 to 0.003 grams per liter.

12. A sealed aquarium in accordance with claim 7 wherein:
    said nitrogen is from 0.0010 to 0.0055 grams per liter;
    said potassium is from 0.0040 to 0.0060 grams per liter; and
    said phosphorous is from 0.0015 to 0.0040 grams per liter.

13. A closed ecological system for sustaining a herbivorous fish, an aquatic algae eating animal and an aquatic plant consisting of a container having a quantity of inert particulate material and a solution comprising:
    distilled water;
    0.00080 to 0.0055 grams per liter of nitrogen;
    0.0040 to 0.013 grams per liter of potassium; and
    0.0011 to 0.0045 grams per liter of phosphorous.

* * * * *